United States Patent
Kamo et al.

(10) Patent No.: US 10,199,678 B2
(45) Date of Patent: *Feb. 5, 2019

(54) NEGATIVE ELECTRODE MATERIAL FOR NON-AQUEOUS ELECTROLYTE SECONDARY BATTERY, NEGATIVE ELECTRODE FOR NON-AQUEOUS ELECTROLYTE SECONDARY BATTERY AND METHOD OF PRODUCING THE SAME, AND NON-AQUEOUS ELECTROLYTE SECONDARY BATTERY

(71) Applicant: SHIN-ETSU CHEMICAL CO., LTD., Tokyo (JP)

(72) Inventors: Hiromichi Kamo, Takasaki (JP); Takakazu Hirose, Annaka (JP); Hiroki Yoshikawa, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 177 days.

This patent is subject to a terminal disclaimer.

(21) Appl. No.: 15/114,686

(22) PCT Filed: Jan. 30, 2015

(86) PCT No.: PCT/JP2015/000424
§ 371 (c)(1),
(2) Date: Jul. 27, 2016

(87) PCT Pub. No.: WO2015/118846
PCT Pub. Date: Aug. 13, 2015

(65) Prior Publication Data
US 2016/0351947 A1    Dec. 1, 2016

(30) Foreign Application Priority Data
Feb. 7, 2014  (JP) .................. 2014-022200

(51) Int. Cl.
*H01M 4/04*   (2006.01)
*H01M 4/131*  (2010.01)
(Continued)

(52) U.S. Cl.
CPC ...... *H01M 10/0525* (2013.01); *H01M 4/0404* (2013.01); *H01M 4/0471* (2013.01);
(Continued)

(58) Field of Classification Search
CPC .. H01M 10/0525; H01M 4/133; H01M 4/583; H01M 4/0404; H01M 4/0471;
(Continued)

(56) References Cited

U.S. PATENT DOCUMENTS 5,395,711 A    3/1995   Tahara et al.
7,459,236 B2   12/2008  Konishiike et al.
(Continued)

FOREIGN PATENT DOCUMENTS

CN    101504980 A    8/2009
JP    2997741 B2     1/2000
(Continued)

OTHER PUBLICATIONS

Jul. 7, 2017 Extended European Search Report issued in Patent Application No. 15746363.9.
(Continued)

*Primary Examiner* — Stewart A Fraser
(74) *Attorney, Agent, or Firm* — Oliff PLC

(57) ABSTRACT

The present invention is a negative electrode material for a non-aqueous electrolyte secondary battery, including negative electrode active material particles containing a silicon compound expressed by $SiO_x$, where $0.5 \leq x \leq 1.6$, the silicon compound containing in its interior a lithium compound and one or more ions selected from Group 1 metal ions, Group 2 metal ions, and substitutable ammonium ions. This nega- (Continued)

tive electrode material for a non-aqueous electrolyte secondary battery can increase the battery capacity and improve the cycle performance and the battery initial efficiency.

18 Claims, 2 Drawing Sheets

(51) Int. Cl.
| | | |
|---|---|---|
| H01M 4/134 | (2010.01) | |
| H01M 10/0525 | (2010.01) | |
| H01M 4/1391 | (2010.01) | |
| H01M 4/36 | (2006.01) | |
| H01M 4/485 | (2010.01) | |
| H01M 4/587 | (2010.01) | |
| H01M 4/62 | (2006.01) | |
| H01M 4/133 | (2010.01) | |
| H01M 4/583 | (2010.01) | |
| H01M 4/02 | (2006.01) | |

(52) U.S. Cl.
CPC ......... *H01M 4/131* (2013.01); *H01M 4/133* (2013.01); *H01M 4/134* (2013.01); *H01M 4/1391* (2013.01); *H01M 4/366* (2013.01); *H01M 4/485* (2013.01); *H01M 4/583* (2013.01); *H01M 4/587* (2013.01); *H01M 4/622* (2013.01); *H01M 2004/021* (2013.01); *H01M 2004/027* (2013.01)

(58) Field of Classification Search
CPC ...... H01M 4/134; H01M 4/131; H01M 4/622; H01M 4/587; H01M 4/485; H01M 4/366; H01M 4/1391; H01M 2004/027; H01M 2004/021
See application file for complete search history.

(56) References Cited

U.S. PATENT DOCUMENTS

| | | | |
|---|---|---|---|
| 8,377,592 B2 | 2/2013 | Jeong et al. | |
| 2006/0099507 A1 | 5/2006 | Kogetsu et al. | |
| 2006/0110660 A1 | 5/2006 | Satou et al. | |
| 2007/0224508 A1* | 9/2007 | Aramata | H01M 4/134 429/231.95 |
| 2008/0176137 A1* | 7/2008 | Endo | H01M 4/133 429/209 |
| 2009/0202911 A1* | 8/2009 | Fukuoka | C23C 16/26 429/231.8 |
| 2011/0135810 A1 | 6/2011 | Yakovleva et al. | |
| 2011/0244333 A1 | 10/2011 | Kawada | |
| 2012/0295155 A1* | 11/2012 | Deng | H01B 1/122 429/200 |
| 2014/0170485 A1* | 6/2014 | Lee | H01M 4/139 429/211 |
| 2014/0356723 A1 | 12/2014 | Suehiro et al. | |
| 2017/0040599 A1* | 2/2017 | Kamo | H01M 4/364 |

FOREIGN PATENT DOCUMENTS

| | | |
|---|---|---|
| JP | 2000-106189 A | 4/2000 |
| JP | 2001-185127 A | 7/2001 |
| JP | 2002-042806 A | 2/2002 |
| JP | 2006-114454 A | 4/2006 |
| JP | 2006-156330 A | 6/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2013-513206 A | 4/2013 |
| JP | 2013-161705 A | 8/2013 |
| WO | 2012/106102 A1 | 8/2012 |
| WO | 2013/062313 A1 | 5/2013 |
| WO | 2013/099278 A1 | 7/2013 |

OTHER PUBLICATIONS

Apr. 7, 2015 International Search Report issued in Japanese Patent Application No. PCT/JP2015/000424.
Aug. 22, 2017 Office Action issued in Japanese Patent Application No. 2014-022200.
Feb. 7, 2017 Office Action issued in Japanese Patent Application No. 2014-022200.
Aug. 9, 2016 Translation of International Preliminary Report on Patentability issued in Patent Application No. PCT/JP2015/000424.
Bruno Lanson, "Decomposition of Experimental X-Ray Diffraction Patterns (Profile Filling): A Convenient Way to Study Clay Minerals," Clays and Clay Material, vol. 45, No. 2, 1997, pp. 132-146.
Jul. 13, 2018 Office Action issued in European Application No. 15 746 363.9.
Apr. 4, 2018 Office Action and Search Report issued in Chinese Application No. 201580007537.3.

* cited by examiner

NEGATIVE ELECTRODE MATERIAL FOR NON-AQUEOUS ELECTROLYTE SECONDARY BATTERY, NEGATIVE ELECTRODE FOR NON-AQUEOUS ELECTROLYTE SECONDARY BATTERY AND METHOD OF PRODUCING THE SAME, AND NON-AQUEOUS ELECTROLYTE SECONDARY BATTERY

TECHNICAL FIELD

The present invention relates to a negative electrode material for a non-aqueous electrolyte secondary battery, a negative electrode for a non-aqueous electrolyte secondary battery and a method of producing the same, and a non-aqueous electrolyte secondary battery.

BACKGROUND ART

In recent years, small electronic devices, represented by mobile terminals, have been widely used and urgently required to reduce the size and weight and to increase the life. Such requirement has advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon material, is required to further improve the battery capacity for recent market requirement. Use of silicon as a negative electrode active material is considered to improve the battery capacity, for silicon has a logical capacity (4199 mAh/g) ten times larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes ranges from an application type to an integrated type in which the materials are directly accumulated on a current collector. These shapes are standard for carbon materials.

Use of silicon as a main material of a negative electrode active material, however, expands or shrinks a negative electrode active material particle when charging or discharging, thereby making the negative electrode active material particle easy to break particularly near its surface layer. In addition, this active material particle produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial efficiency and the cycle performance of the battery.

More specifically, a vapor deposition method is used to accumulate silicon and amorphous silicon dioxide simultaneously so that better cycle performance and greater safety are achieved (See Patent Document 1, for example). Moreover, a carbon material, an electronic conduction material, is disposed on the surface of silicon oxide particles so that a higher battery capacity and greater safety are achieved (See Patent Document 2, for example). Moreover, an active material including silicon and oxygen is produced to form an active material layer having a higher ratio of oxygen near a current collector so that improved cycle performance and higher input-output performance are achieved (See Patent Document 3, for example). Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example). Moreover, a lithium containing material is added to a negative electrode, and pre-doping that decompose lithium and moves the lithium to a positive electrode at a higher negative-electrode potential so that the first charge and discharge efficiency is improved (See Patent Document 6, for example).

Moreover, $SiO_x$ ($0.85 \leq x \leq 1.5$) having a particle size ranging from 1 μm to 50 μm and a carbon material are mixed and calcined at a high temperature so that improved cycle performance is achieved (See Patent Document 7, for example). Moreover, a mole ratio of oxygen to silicon in a negative electrode active material is adjusted in the range from 0.1 to 1.2 so as to hold a difference between the maximum and the minimum of the oxygen-to-silicon mole ratio near the interface between the active material and a current collector at 0.4 or less, so that improved cycle performance is achieved (See Patent Document 8, for example). Moreover, a metal oxide containing lithium is used to improve the battery load characteristic (See Patent Document 9, for example). Moreover, a hydrophobic layer such as a silane compound is formed in the surface layer of a silicon material so that improved cycle performance is achieved (See Patent Document 10, for example).

Moreover, a silicon oxide is used and coated with graphite to give conductivity so that improved cycle performance is achieved (See Patent Document 11, for example). Patent Document 11 describes that a shift value of the graphite coating, which is obtained from a Raman spectrum, has broad peaks at 1330 $cm^{-1}$ and 1580 $cm^{-1}$ and a ratio $I_{1330}/I_{1580}$ of its intensity shows $1.5 < I_{1330}/I_{1580} < 3$.

Moreover, a particle having an Si-microcrystal phase dispersing in a silicon dioxide is used to achieve a higher battery capacity and improved cycle performance (See Patent Document 12, for example). Finally, a silicon oxide having a silicon-to-oxygen atomicity ratio of 1:y ($0 < y < 2$) is used to improve overcharge and overdischarge performance (See Patent Document 13, for example).

CITATION LIST

Patent Literature

Patent Document 1: Japanese Unexamined Patent publication (Kokai) No. 2001-185127
Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kokai) No. 2013-513206
Patent Document 7: Japanese Unexamined Patent publication (Kokai) No. 2008-282819
Patent Document 8: Japanese Unexamined Patent publication (Kokai) No. 2008-251369
Patent Document 9: Japanese Unexamined Patent publication (Kokai) No. 2008-177346
Patent Document 10: Japanese Unexamined Patent publication (Kokai) No. 2007-234255
Patent Document 11: Japanese Unexamined Patent publication (Kokai) No. 2009-212074
Patent Document 12: Japanese Unexamined Patent publication (Kokai) No. 2009-205950
Patent Document 13: Japanese Patent No. 2997741

SUMMARY OF INVENTION

Technical Problem

As described previously, small mobile devices, represented by electronic devices, have been developed to improve their performance and increase their functions. Non-aqueous electrolyte secondary batteries, especially lithium-ion secondary batteries, which are used as main sources of the devices, have been required to increase the battery capacity. The development of non-aqueous electrolyte secondary batteries including negative electrodes mainly using silicon materials have been desired to solve this problem. The non-aqueous electrolyte secondary batteries using silicon materials need the same cycle performance as non-aqueous electrolyte secondary batteries using carbon materials.

The present invention was accomplished in view of the above problems, and an object thereof is to provide a negative electrode material for a non-aqueous electrolyte secondary battery that can increase the battery capacity and improve the cycle performance and the battery initial efficiency. Another object of the present invention is to provide a negative electrode for a non-aqueous electrolyte secondary battery using the negative electrode material and a non-aqueous electrolyte secondary battery using the negative electrode. Further object of the present invention is to provide a method of producing the negative electrode for a non-aqueous electrolyte secondary battery.

Solution to Problem

To achieve the objects, the present invention provides a negative electrode material for a non-aqueous electrolyte secondary battery, comprising:

negative electrode active material particles containing a silicon compound expressed by $SiO_x$, where $0.55 \leq x \leq 1.6$, the silicon compound containing in its interior a lithium compound; and one or more ions selected from Group 1 metal ions, Group 2 metal ions, and substitutable ammonium ions.

The negative electrode material having such negative electrode active material particles, in which a $SiO_2$ component part to be destabilized with insertion and extraction of lithium is previously modified into a lithium compound, can reduce irreversible capacity generated at charging. Moreover, the metal ion and the substitutable ammonium ion contained therein enables preservation of the modified $SiO_2$. This allows the negative electrode material to have excellent resistance to an organic solvent and a water solvent as well as excellent capacity retention rate and initial efficiency. Moreover, this negative electrode material is mainly made of the silicon compound and thus can increase the battery capacity.

It is preferred that the silicon compound is at least partially coated with a carbon coating, and the carbon coating exhibits scattering peaks at 1330 $cm^{-1}$ and 1580 $cm^{-1}$ in Raman spectrometry and satisfies $0.7<I_{1330}/I_{1580}<2.0$ where $I_{1330}/I_{1580}$ is a ratio of an intensity of the scattering peak at 1330 $cm^{-1}$ to that at 1580 $cm^{-1}$.

Such a negative electrode material for a non-aqueous electrolyte secondary battery can have the optimum ratio of a carbon material with the diamond structure to a carbon material with the graphite structure in the carbon coating. Consequently, a non-aqueous electrolyte secondary battery using a negative electrode composed of the negative electrode material that has the negative electrode active material particles coated with the carbon coating can exhibit good battery performances.

It is preferred that the negative electrode active material particles are at least partially surrounded with a carbon-based material having a median size smaller than that of the silicon compound, and the carbon-based material exhibits scattering peaks at 1330 $cm^{-1}$ and 1580 $cm^{-1}$ in Raman spectrometry and satisfies $0.3<I_{1330}/I_{1580}<1.2$ where $I_{1330}/I_{1580}$ is a ratio of an intensity of the scattering peak at 1330 $cm^{-1}$ to that at 1580 $cm^{-1}$.

Such a negative electrode material for a non-aqueous electrolyte secondary battery can greatly prevent the carbon material from occluding lithium and thus minimize reduction in the battery performances. Additionally, this negative electrode material can improve conductivity to the negative electrode active material particles.

The ion preferably surrounds either or both of the carbon coating and the carbon-based material.

Such a negative electrode material for a non-aqueous electrolyte secondary battery further improves resistance to a water solvent.

The ion is preferably added in the form of either or both of a metal salt and a substitutable ammonium salt.

In this manner, the ion is preferably added in the form of salt to be contained in the negative electrode material.

The metal salt preferably comprises at least one of a lithium salt, a sodium salt, and a potassium salt.

Such metal salts can inhibit elution of the lithium compound inside the silicon compound.

The negative electrode material preferably further comprises a binder containing at least one functional group selected from a carbonyl group, a hydroxyl group, and an amino group.

Such a negative electrode material for a non-aqueous electrolyte secondary battery causes the functional group to draw the metal ion and then more metal salts (ions) to surround the carbon material (the carbon coating and the carbon-based material).

The binder preferably comprises at least one of carboxymethyl cellulose, an alkali metal salt thereof, polyacrylic acid, an alkali metal salt thereof, and polyvinyl alcohol.

This binder contains the aforementioned functional group, so that the negative electrode material containing this binder is preferable.

The silicon compound preferably contains on its surface at least one lithium compound selected from $Li_2CO_3$, $Li_2O$, LiOH, and LiF.

Additionally, the silicon compound preferably contains in its interior at least one lithium compound selected from $Li_2SiO_3$, $Li_6Si_2O_7$, and $Li_4SiO_4$.

Such silicon compounds make the present invention more effective.

A content of the carbon coating is preferably 20 mass % or less with respect to a total of the silicon compound and the carbon coating.

Such a negative electrode material for a non-aqueous electrolyte secondary battery enables a sufficient capacity.

The negative electrode active material particles preferably exhibit a diffraction peak having a half width (2θ) of 1.2° or more, the diffraction peak being attributable to a (111) crystal face and obtained by X-ray diffraction, and a crystallite size attributable to the crystal face is 7.5 nm or less.

This silicon compound, which exhibits the above half width and crystallite size, has low crystallinity. Use of the silicon compound having low crystallinity, which has a few Si crystal, enables improvement in the battery performances.

The negative electrode active material particles preferably have a median size ranging from 0.5 µm to 20 µm.

Such a negative electrode material for a non-aqueous electrolyte secondary battery can improve the capacity retention rate.

The negative electrode active material particles are preferably produced by a method including an electrochemical manner.

The process including an electrochemical manner to produce the silicon compound containing the lithium compound yields a stable lithium compound.

The ion preferably has a concentration ranging from $1 \times 10^{-3}$ mass % to 2 mass % in terms of a metal ion or an ammonium ion.

Such a negative electrode material for a non-aqueous electrolyte secondary battery allows the ion to sufficiently function as a coating layer, improving resistance to an organic solvent and a water solvent. Moreover, this negative electrode material can keep flowability of negative electrode slurry and prevents degradation of the silicon compound, thus preventing reduction in the battery performances.

Furthermore, the present invention provides a negative electrode for a non-aqueous electrolyte secondary battery comprising the inventive negative electrode material.

The negative electrode using the inventive negative electrode material enables a non-aqueous electrolyte secondary battery using this negative electrode to have improved cycle performance and initial charge and discharge performance.

The negative electrode preferably further comprises a carbon-based active material.

Such a negative electrode for a non-aqueous electrolyte secondary battery can improve the initial efficiency and the capacity retention rate as well as increase the negative electrode capacity.

A content of the silicon compound is preferably 5 mass % or more and less than 90 mass % with respect to the carbon-based active material.

Such a negative electrode for a non-aqueous electrolyte secondary battery prevents reduction in the initial efficiency and the capacity retention rate.

Furthermore, the present invention provides a non-aqueous electrolyte secondary battery comprising the inventive negative electrode.

The non-aqueous electrolyte secondary battery using the inventive negative electrode can improve the cycle performance and the initial charge and discharge performance.

Furthermore, the present invention provides a method of producing a negative electrode for a non-aqueous electrolyte secondary battery, the method comprising:

producing a silicon compound expressed by $SiO_x$ where $0.5 \leq x \leq 1.6$;

inserting lithium into the silicon compound and thereby forming a lithium compound inside the silicon compound to modify the silicon compound and obtain negative electrode active material particles;

mixing the negative electrode active material particles with a solvent and one or more salts selected from Group 1 metal salts, Group 2 metal salts, and substitutable ammonium salts to form slurry; and applying the slurry to a surface of a negative electrode current collector and drying the slurry to form a negative electrode active material layer.

The method of producing a negative electrode for a non-aqueous electrolyte secondary battery, including such steps, enables a stable production of a negative electrode for a non-aqueous electrolyte secondary battery that can increase the battery capacity and improve the cycle performance and the battery initial efficiency. Moreover, addition of the metal salt and/or the substitutable ammonium salt into the slurry enables prevention of elution of the lithium compound in the resultant negative electrode.

Advantageous Effects of Invention

In the inventive negative electrode material for a non-aqueous electrolyte secondary battery, a $SiO_2$ component part, which is destabilized with insertion and extraction of lithium in the silicon compound, is previously modified into another compound. Such a negative electrode material can reduce irreversible capacity generated at charging. The compound obtained by modifying $SiO_2$ is a substance to which lithium is partially inserted. In regard to the production of this compound, electrochemical modification of the silicon compound can yield a stable lithium compound inside the battery (negative electrode). Moreover, the metal ion and the substitutable ammonium ion contained in the negative electrode material enables preservation of the modified $SiO_2$. This allows the negative electrode material to have excellent resistance to an organic solvent and a water solvent as well as excellent capacity retention rate and initial efficiency.

The negative electrode for a non-aqueous electrolyte secondary battery using the inventive negative electrode material and the non-aqueous electrolyte secondary battery using this negative electrode, in which the $SiO_2$ component has been modified, can improve the cycle performance and the initial charge and discharge performance. In addition, electronic devices, machine tools, electric vehicles, and power storage systems, etc., using the inventive secondary battery can achieve the same effect.

Moreover, the method of producing a negative electrode for a non-aqueous electrolyte secondary battery enables stable production of a negative electrode for a non-aqueous electrolyte secondary battery that has the foregoing performances.

DESCRIPTION OF EMBODIMENTS

As described previously, use of a negative electrode mainly made of a silicon material, for use in a non-aqueous electrolyte secondary battery, has been considered to increase the capacity of the non-aqueous electrolyte secondary battery.

The non-aqueous electrolyte secondary battery using a silicon material is required to have the same cycle performance as a non-aqueous electrolyte secondary battery using a carbon material; however, no one has yet proposed a negative electrode material for this type of battery having the same cycle stability as a non-aqueous electrolyte secondary battery using a carbon material. In addition, a silicon compound especially containing oxygen has a lower initial efficiency than that of any carbon material, thereby limiting improvement in battery capacity.

In view of this, the present inventors diligently conducted study on a negative active material that allows a non-aqueous secondary battery using a negative electrode made of this material to have better cycle performance and initial efficiency, thereby bringing the present invention to completion.

The inventive negative electrode material for a non-aqueous electrolyte secondary battery includes the negative electrode active material particles containing a silicon compound expressed by $SiO_x$ ($0.5 \leq x \leq 1.6$). The silicon compound contains in its interior a lithium compound. This negative electrode material further includes one or more ions selected from Group 1 metal ions, Group 2 metal ions, and substitutable ammonium ions.

Hereinafter, embodiments of the present invention will be specifically described with reference to the drawings, but the present invention is not limited thereto.

<1. Negative Electrode for Non-Aqueous Electrolyte Secondary Battery>

Figure 1:
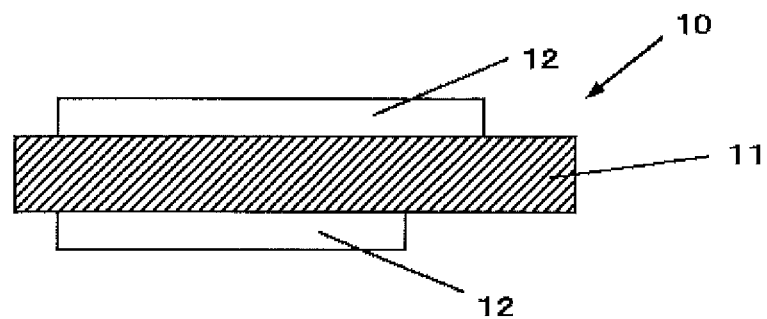
FIG. 1 is a schematic cross-sectional view of a configuration of a negative electrode for a non-aqueous electrolyte secondary battery according to an embodiment of the invention.

A negative electrode for a non-aqueous electrolyte secondary battery using the inventive negative electrode material for a non-aqueous electrolyte secondary battery will be now described. FIG. 1 shows the cross-section of a negative electrode for a non-aqueous electrolyte secondary battery (simply referred to as a negative electrode below) according to an embodiment of the invention.

[Configuration of Negative Electrode]

As shown in FIG. 1, the negative electrode 10 has a negative electrode active material layer 12 on a negative electrode current collector 11. The negative electrode active material layer 12 may be disposed on one side or both sides of the negative electrode current collector 11. The negative electrode current collector 11 is not necessarily needed in a negative electrode using the inventive negative electrode active material.

[Negative Electrode Current Collector]

The negative electrode current collector 11 is made of a highly conductive and mechanically strong material. Examples of the conductive material used for the negative electrode current collector 11 include copper (Cu) and nickel (Ni). Such conductive materials preferably have inability to form an intermetallic compound with lithium (Li).

The negative electrode current collector 11 preferably contains carbon (C) and sulfur (S) besides the main element because these elements improve the physical strength of the negative current collector. In particular, when the active material layer contains a material expandable at charging, the current collector containing the above elements can inhibit deformation of the electrodes and the current collector itself. The amount of the contained elements is preferably, but not particularly limited to, 100 ppm or less. This amount enables effective inhibition of the deformation.

The surface of the negative electrode current collector 11 may or may not be roughed. Examples of the negative electrode current collector roughened include a metallic foil subjected to an electrolyzing process, an embossing process, or a chemical etching process. Examples of the negative electrode current collector that is not roughened include a rolled metallic foil.

[Negative Electrode Active Material Layer]

The negative electrode active material layer 12 contains particulate negative electrode materials (hereinafter, referred to as negative electrode active material particles) that can occlude and emit lithium ions and may further contain other materials such as a negative electrode binder or a conductive additive depending on battery design. The inventive negative electrode material for a non-aqueous electrolyte secondary battery can be used for the negative electrode active material layer 12.

The negative electrode active material particles used in the inventive negative electrode material each contain a silicon compound that can occlude and emit lithium ions and a lithium compound in the interior of the silicon compound. The silicon compound may contain a lithium compound on its surface, as described below. In addition, the inventive negative electrode material contains one or more ions selected from Group 1 metal ions and Group 2 metal ions in the periodic table, and substitutable ammonium ions. This structure can be observed by photography of transmission electron microscope-energy dispersive X-ray spectroscopy (TEM-EDX), or electron energy loss spectroscopy (EELS).

The negative electrode active material particle used in the inventive negative electrode material is a silicon oxide containing a silicon compound ($SiO_x$, where $0.5 \leq x \leq 1.6$); a preferable composition of the silicon compound is that x is close to 1. The reason is that this composition enables high cycle performance. The present invention does not necessarily intend a silicon material composition of 100% but permits a silicon material containing a minute amount of impurities.

Such negative electrode active material particles can be obtained by selectively modifying a part of the $SiO_2$ components formed inside the silicon compound into a lithium compound. Examples of the lithium compound inside the silicon compound include $Li_4SiO_4$, $Li_6Si_2O_7$, and $Li_2SiO_3$, which especially have good performance.

The lithium compound can be quantified by Nuclear Magnetic Resonance (NMR) and X-ray Photoelectron Spectroscopy (XPS). XPS and NMR measurements can be performed, for example, under the following conditions. XPS
  Apparatus: an X-ray photoelectron spectroscopy apparatus
  X-ray Source: a monochromatic Al-Kα ray
  X-ray Spot Diameter: 100 μm
  Ar-ion Sputtering Gun Conditions: 0.5 kV, 2 mm×2 mm
  $^{29}$Si-MAS-NMR
  Apparatus: a 700-NMR spectroscope made by Bruker Corp.
  Probe: a 4-mm-HR-MAS rotor, 50 μL
  Sample Rotation Speed: 10 kHz
  Temperature of Measurement Environment: 25° C.

The formation of the selective compound, i.e., the modification of the silicon compound is preferably carried out in an electrochemical manner.

Such modification (bulk modification) to produce the negative electrode active material particles can reduce or prevent the lithium compound formation in an Si region, yielding a substance stable in the air, water slurry, or solvent slurry. Moreover, electrochemical modification enables production of a more stable substance than thermal modification (thermal doping method), in which the compound is randomly modified.

$Li_4SiO_4$, $Li_6Si_2O_7$, and $Li_2SiO_3$ can improve the performance when at least one of them is formed in a bulk of the silicon compound, and the combination of two or more of them can further improve the performance.

In the present invention, the silicon compound preferably contains on its surface at least one lithium compound selected from LiF, $Li_2CO_3$, $Li_2O$, and LiOH.

When the lithium compound is formed on the inventive silicon compound, the powder storage property is dramatically improved. In particular, the lithium compound is preferably formed on the carbon coating of the silicon compound. The lithium compound is preferably formed on the silicon compound with a coverage of 30% or more. The most preferable material is LiF. The most preferable forming method is an electrochemical method, though not particularly limited thereto. Among these lithium compounds, $Li_2O$ combines with water during negative electrode production and then changes into LiOH at least partially or completely.

The inventive negative electrode material is characterized by containing one or more ions selected from Group 1 metal ions, Group 2 metal ions, and substitutable ammonium ions. Above all, lithium ion, sodium ion, and potassium ion, particularly lithium ion and sodium ion are preferably contained. The metal ion can be added to the negative electrode material by, for example, mixing corresponding salts at the time of forming negative electrode slurry.

The negative electrode material containing the above ions can improve resistance to an organic solvent and a water solvent with containing the compound obtained by modifying a part of the $SiO_2$ components into a lithium compound.

The ion has a concentration preferably ranging from $1\times10^{-3}$ mass % to 2 mass %, more preferably from $1\times10^{-3}$ mass % to 0.1 mass %, in terms of a metal ion or an ammonium ion. An ion content of $1\times10^{-3}$ mass % or more makes the coating layer effective, improving the resistance to an organic solvent and a water solvent. An ion content of 2 mass % or less then keeps flowability of negative electrode slurry and prevents degradation of the silicon compound, thus preventing reduction in the battery performances.

The amount of the metal ion contained in the inventive negative electrode can be calculated by, for example, elemental analysis.

The ion is preferably added, in advance, in the form of either or both of a metal salt and a substitutable ammonium salt. For example, a metal salt or a substitutable ammonium salt may be added at the time of forming slurry to dissolve the salt in a solvent such as water or an organic solvent, as described below. The slurry in which the ion is dissolved can be thereby obtained.

Examples of the Group 1 metal salt and the Group 2 metal salt include lithium salt, sodium salt, and potassium salt. More specifically, examples of the sodium salt include carbonates such as sodium carbonate, silicates such as sodium silicate, carboxymethyl cellulose salts such as sodium carboxymethyl cellulose, and polyacrylates such as sodium polyacrylate. Examples of the lithium salt, potassium salt, and other metal salts (e.g., magnesium salts, calcium salts, and strontium salts) of Group 1 and Group 2 likewise include carbonates, silicates, carboxymethyl cellulose salts, and polyacrylates thereof.

Examples of the substitutable ammonium salt include ammonium salts including carbonates such as ammonium carbonate, silicates such as ammonium silicate, carboxymethyl cellulose salts such as ammonium carboxymethyl cellulose, and polyacrylates such as ammonium polyacrylate; and substituted ammonium salts. Herein, the term "substitutable ammonium ion" is used to describe a substituted or unsubstituted ammonium ion. The "substituted" ammonium means that a hydrogen atom of an ammonium ion is substituted with other atomic group. Examples of such ions include tetramethyl ammonium, tetraphenyl ammonium, and 1-butyl-3-methyl imidazolium.

Among the above metal salts, lithium salts and sodium salts are particularly preferable. The compound obtained by modifying a part of the $SiO_2$ components in the silicon compound of the negative electrode material into a lithium compound has weak water resistance due to the lithium compound therein. If a salt equivalent to a lithium salt exists in an aqueous solution, elution of the lithium compound inside the silicon compound can be inhibited. Among the metal salts, sodium salts, which have an ionic radius close to that of lithium ions and lithium salts, highly inhibit the elution of the lithium compound and thus are very effective.

Preferable raw materials of the metal salt are hydroxides, silicates, and carbonates. These materials have a form corresponding to the lithium compound contained in the silicon compound of the negative electrode material ($Li_2CO_3$, $Li_2O$, LiOH, and LiF on the surface of the silicon compound and $Li_2SiO_3$, $Li_6Si_2O_7$, and $Li_4SiO_4$ in the interior of the silicon compound), and thus more greatly inhibit the elution of the lithium compound.

The ion preferably surrounds either or both of the carbon coating and the carbon-based material described below. This enables improvement in resistance to a water solvent.

In this case, the negative electrode material preferably further includes a binder containing at least one of a carbonyl group, a hydroxyl group, and an amino group as a functional group described below. This functional group draws the metal ion so that more metal salts (ions) surround the carbon material (the carbon coating and the carbon-based material).

A binder may be added to the inventive negative electrode material, if necessary. The binder preferably contains at least one functional group selected from a carbonyl group, a hydroxyl group, and an amino group, as described above. This improves the resistance to an organic solvent and a water solvent derived from the metal salt (ion) more greatly, consequently improving the battery performances. The binder preferably includes at least one of carboxymethyl cellulose, an alkali metal salt thereof, polyacrylic acid, an alkali metal salt thereof, and polyvinyl alcohol, which contain the above functional group.

The negative electrode binder may be, for example, one or more of a polymer material and a synthetic rubber. Examples of the polymer material include polyvinylidene fluoride, polyimide, polyamideimide, aramid, polyvinyl alcohol, polyacrylic acid, lithium polyacrylate, and carboxymethyl cellulose. Examples of the synthetic rubber include styrene-butadiene rubber, a fluorinated rubber, and an ethylene-propylene-diene.

It is preferred that the silicon compound is at least partially coated with a carbon coating, and the carbon coating exhibits scattering peaks at 1330 $cm^{-1}$ and 1580 $cm^{-1}$ in Raman spectrometry and satisfies $0.7<I_{1330}/I_{1580}<2.0$ where $I_{1330}/I_{1580}$ is a ratio of an intensity of the scattering peak at 1330 $cm^{-1}$ to that at 1580 $cm^{-1}$.

Examples of the method of forming the carbon coating include coating the silicon compound with a carbon material (a carbon compound) such as graphite.

The amount of the carbon coating is preferably 20 mass % or less with respect to the total amount of the silicon compound and the carbon coating. The amount of the carbon coating is more preferably 0 mass % to 15 mass %.

This enables improvement in electrical conductivity. If the amount is 20 mass % or less, the deterioration of the battery performances and the reduction in the battery capacity can be prevented. The coating method with a carbon coating is preferably, but not particularly limited to, sugar carbonization or pyrolysis of hydrocarbon gas, for these methods can improve the carbon coverage.

The silicon compound may be coated with the carbon coating and the lithium compound such as LiF in any order.

The negative electrode active material particles are preferably surrounded with a carbon-based material having a median size smaller than that of the silicon compound.

In this case, the carbon-based material preferably exhibits scattering peaks at 1330 $cm^{-1}$ and 1580 $cm^{-1}$ in Raman spectrometry and satisfies $0.3<I_{1330}/I_{1580}<1.2$ where $I_{1330}/I_{1580}$ is a ratio of an intensity of the scattering peak at 1330 $cm^{-1}$ to that at 1580 $cm^{-1}$. The intensity ratio $I_{1330}/I_{1580}$ of the carbon-based material is more preferably $0.5<I_{1330}/I_{1580}<1.0$. This range allows improvement in electrical conductivity between particles of the silicon compound. The carbon-based material can be around the negative electrode active material particles by, for example, physically mixing with the negative electrode active material particles.

The Raman spectrometry will now be described in detail. The micro-Raman analysis (Raman spectrometry) can obtain the ratio of a carbon material with the diamond structure (the carbon coating or the carbon-based material) to a carbon material with the graphite structure, from the Raman spectrum. More specifically, diamond exhibits a sharp peak at a Raman shift of 1330 $cm^{-1}$; graphite exhibits a sharp peak at a Raman shift of 1580 $cm^{-1}$. The ratio of the carbon material with the diamond structure to one with the graphite structure can be readily obtained from the ratio of the intensity of these peaks.

Diamond has high strength, high density, and are highly insulating; graphite is excellent in conductivity. The carbon material satisfying the above intensity ratio makes the best use of both properties, thereby enabling the electrode to be prevented from breaking due to the expansion and contraction of its material at charging and discharging. This negative electrode material has an excellent conductive network.

A lower crystallinity of the silicon compound contained in the inventive negative electrode material is better. More specifically, the silicon compound preferably exhibits a diffraction peak having a half width (2θ) of 1.20 or more that is attributable to a (111) crystal face and obtained by X-ray diffraction, and a crystallite size of 7.5 nm or less that is attributable to the crystal face. The inventive negative electrode material, which contains the silicon compound with low crystallinity, can improve the battery performances. A stable lithium compound is produced by existence of the silicon compound with low crystallinity.

The median size of the silicon compound preferably ranges from 0.5 μm to 20 μm, but not particularly limited thereto. This range makes it easy to occlude and emit lithium ions and inhibits the breakage of the particles at charging and discharging. A median size of 0.5 μm or more then prevents the area surface from increasing and can thus reduce the battery irreversible capacity; a median size of 20 μm or less preferably inhibits the breakage of the particles and the creation of a new surface.

Examples of the negative electrode conductive additive include carbon materials (carbon-based materials) such as carbon black, acetylene black, graphite such as flaky graphite, ketjen black, carbon nanotube, carbon nanofiber, and a combination thereof. As described previously, these conductive additives are preferably particles having a median size smaller than that of the silicon compound.

The negative electrode active material layer 12 shown in FIG. 1 may be produced with a mixture of the inventive negative electrode material including the negative electrode active material particles and a carbon material (a carbon-based active material). In this manner, the negative electrode active material layer 12 can reduce its electrical resistance and a stress due to its expansion at charging. Examples of the carbon-based active material include pyrolytic carbons, cokes, glassy carbon fiber, a fired organic polymeric compound, and carbon black.

In this case, the content of the silicon compound is preferably 5% or more and less than 90% with respect to the carbon-based active material. Such a negative electrode for a non-aqueous electrolyte secondary battery prevents reduction in the initial efficiency and the capacity retention rate.

The negative electrode active material layer 12 may be formed by, for example, an application method. The application method is to mix the negative electrode active material particles and the binders, in addition to the conductive additive and the carbon material as needed, and disperse the resultant mixture into an organic solvent or water to apply the resultant to a subject.

[Method of Producing Negative Electrode]

The inventive method of producing a negative electrode will be now described. The method begins with a production of a silicon compound expressed by $SiO_x$ (0.5≤x≤1.6). The silicon compound is then modified by inserting lithium into the silicon compound and thereby forming a lithium compound inside the silicon compound to obtain negative electrode active material particles. The negative electrode active material particles is mixed with a solvent and one or more salts selected from Group 1 metal salts, Group 2 metal salts, and substitutable ammonium salts to form slurry. The slurry is applied to the surface of a negative electrode current collector and dried to form a negative electrode active material layer.

More specifically, the negative electrode can be produced by, for example, the following procedure.

First, a raw material capable of generating a silicon oxide gas is heated under an inert gas atmosphere or a reduced pressure at a temperature ranging from 900° C. to 1600° C. to produce the silicon oxide gas. The raw material is a mixture of metallic silicon powder and silicon dioxide powder. The mole ratio of the mixture preferably satisfies the relation of 0.8<metallic silicon powder/silicon dioxide powder<1.3, in consideration of the existence of oxygen on the metallic silicon powder surface and a minute amount of oxygen in a reactor. The Si-crystallites in the particles are controlled by adjustment of an arrangement range and a vaporization temperature, or heat treatment after the production. The produced gas is deposited on an adsorption plate. The temperature in the reactor is decreased to 100° C. or less and then a deposit is taken out. The deposit is then pulverized with a ball mill or a jet mill to form powder.

Then, the obtained powder material may be coated with a carbon layer, but this step is not essential.

Thermal CVD is desirably used to form the carbon layer on the obtained powder material. This thermal CVD is to fill a furnace in which the silicon oxide powder is placed with a hydrocarbon gas and heat the interior of the furnace. The pyrolysis temperature is preferably, but not particularly limited to, 1200° C. or less, more preferably 950° C. or less. This range enables inhibition of disproportionation of the active material particles.

The thermal CVD to form the carbon layer can be performed, for example, while the pressure and temperature in the furnace are adjusted. This adjustment allows the carbon coating on the powder material to have a desired peak intensity ratio in Raman spectrometry.

If a carbon-based material having a median diameter smaller than that of the silicon compound is added, acetylene black can be added as the carbon-based material, for example.

The hydrocarbon gas preferably has a composition of $C_nH_m$ where 3≥n, but is not particularly limited thereto, for this composition enables reduction in production cost and improvement in physical properties of a pyrolysis product.

Figure 2:
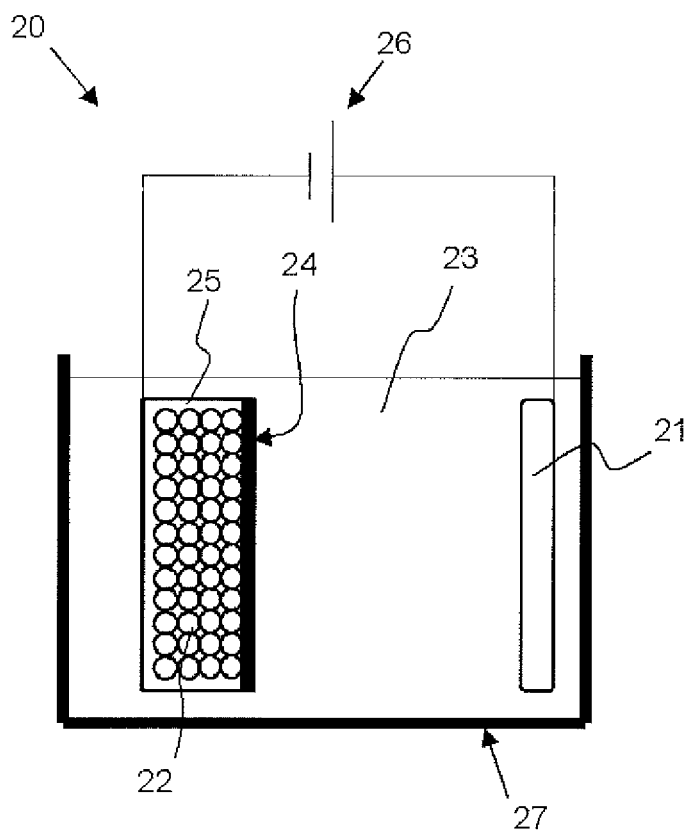
FIG. 2 is a schematic view of a bulk modification apparatus that can used in the inventive method of producing a negative electrode for a non-aqueous electrolyte secondary battery.

The bulk modification is preferably performed by inserting and extracting lithium in an electrochemical manner. Although apparatus structure is not particularly limited, bulk modification can be performed with, for example, a bulk modification apparatus 20 shown in FIG. 2. The bulk modification apparatus 20 includes a bath 27 filled with an organic solvent 23, a positive electrode 21 (lithium source) provided within the bath 27 and connected to one terminal of a power source 26, a powder storage container 25 provided within the bath 27 and connected to the other terminal of the power source 26, and a separator 24 provided between the positive electrode 21 and the powder storage container 25. In the powder storage container 25, silicon compound powder 22 is stored.

In the bulk modification treatment, when a lithium compound, such as a fluorinated compound, is formed on the surface, the compound is preferably formed by changing voltage and temperature conditions. This yields a dense film. In particular, fluorinated lithium is preferably formed by keeping the temperature at 45° C. or higher during insertion and extraction of lithium for 24 hours and then shaped into a film coating the active material.

The silicon compound may be coated with the carbon coating and the lithium compound such as LiF in any order. To coat the silicon compound with the carbon coating and the lithium compound in this order, the balk modification is performed after the thermal CVD. This yields negative electrode active material particles in which the lithium compound is formed on the outermost surface. To coat the silicon compound with the lithium compound and the carbon coating in this order, the thermal CVD is performed after the balk modification. This yields negative electrode active material particles in which the carbon coating is formed on the outermost surface.

The modified particles thus obtained may contain no carbon layer. However, when more uniform control is required in the bulk modification treatment, potential distribution needs to be reduced, and thus the carbon layer is desirably contained.

Examples of the organic solvent 23 in the bath 27 include ethylene carbonate, propylene carbonate, dimethyl carbonate, diethyl carbonate, ethylmethyl carbonate, fluoromethylmethyl carbonate, and difluoromethylmethyl carbonate. Examples of electrolyte salt contained in the organic solvent 23 include lithium hexafluorophosphate ($LiPF_6$) and lithium tetrafluoroborate ($LiBF_4$).

As the positive electrode 21, a lithium foil or a Li-containing compound may be used. Examples of the Li-containing compound include lithium carbonate and lithium oxide.

Subsequently, the negative electrode active material particles are mixed with the negative electrode binder and other materials such as conductive additives. The resultant negative electrode mixture is then mixed with a solvent such as an organic solvent or water to form slurry. At this time, either or both of the metal salt and the substitutable ammonium salt are added. The mixture slurry is then applied to the surface of a negative electrode current collector and dried to form a negative electrode active material layer 12 shown in FIG. 1. If necessary, heating press may be performed.

This negative electrode, in which the $SiO_2$ component in the bulk is modified into a stable lithium compound, can improve the battery initial efficiency and stability of the active material with cycle performance. Higher effect can be achieved by forming lithium silicate in the bulk.

When the negative electrode active material particles are surrounded with a layer containing one or more ions selected from Group 1 metal salts (ions) and Group 2 metal salts (ions) in the periodic table and substitutable ammonium salts (ions), the resistance to a water solvent is improved.

In addition, coating the silicon compound with a carbon material makes the compound condition in the bulk more uniform, and a fluorine compound on the surface layer improves stability of the active material, yielding higher effect.

A negative electrode current collector containing carbon and sulfur in an amount of 90 ppm or less is more effective.

<2. Lithium-Ion Secondary Battery>

A lithium-ion secondary battery using the above negative electrode for a lithium-ion secondary battery will be now described.

[Configuration of Laminate Film Secondary Battery]

Figure 3:
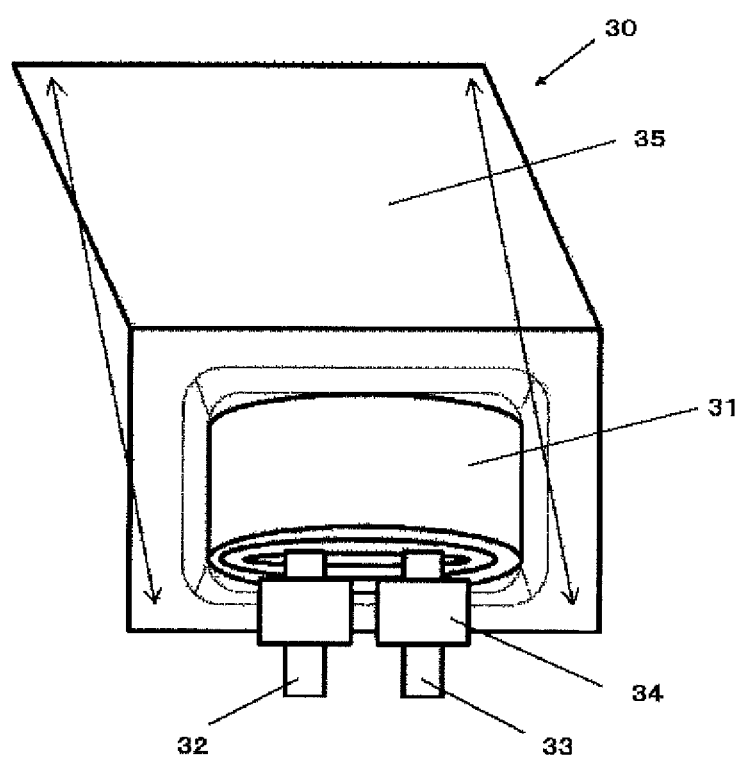
FIG. 3 is an exploded view of a laminate film type of secondary battery according to an embodiment of the invention.

The laminate film secondary battery 30 shown in FIG. 3 includes a wound electrode body 31 interposed between sheet-shaped outer parts 35. The wound body are formed by winding a positive electrode, a negative electrode, and a separator disposed between these electrodes. The electrode body may also be composed of a laminated part of the positive and negative electrodes, and a separator disposed between these electrodes. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead and the negative-electrode lead, for example, extends from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the wound electrode body 31. The fusion-bond layer may be, for example, a film such as a polyethylene or polypropylene film; the metallic layer may be aluminum foil; the protecting layer may be, for example, nylon.

The space between the outer parts 35 and the positive and negative electrode leads is filled with close adhesion films 34 to prevent air from entering therein. Exemplary materials of the close adhesion films include polyethylene, polypropylene, and polyolefin resins.

[Positive Electrode]

The positive electrode has a positive electrode active material layer disposed on one side or both sides of a positive electrode current collector as in the negative electrode 10 shown in FIG. 1, for example.

The positive electrode current collector is made of, for example, a conductive material such as aluminum.

The positive electrode active material layer contains a positive electrode material that can occlude and emit lithium ions or a combination of positive electrode materials, and may contain a binder, a conductive additive, a dispersing agent, or other materials according to design. The same detailed description as described for the negative electrode binders and negative electrode conductive additive, for example, is then given for this binder and this conductive additive.

The positive electrode material is preferably a compound containing lithium. Examples of the lithium-containing compound include a complex oxide composed of lithium and transition metal elements, and a phosphoric acid compound containing lithium and transition metal elements. Among them, a compound containing at least one of nickel, iron, manganese, and cobalt is preferable for the positive electrode material. The chemical formula of this compound is expressed by, for example, $Li_xM_1O_2$ or $Li_yM_2PO_4$, where $M_1$ and $M_2$ represent at least one kind of transition metal elements, and x and y represent a value varied depending on a charging or discharging status of a battery, which typically satisfy $0.055 \leq x \leq 1.10$ and $0.055 \leq y \leq 1.10$.

Examples of the complex oxide composed of lithium and transition metal elements include a lithium cobalt complex oxide ($Li_xCoO_2$), a lithium nickel complex oxide ($Li_xNiO_2$). Examples of the phosphoric acid compound containing lithium and transition metal elements include a lithium iron phosphoric acid compound ($LiFePO_4$), a lithium iron manganese phosphoric acid compound ($LiFe_{1-u}Mn_uPO_4$ ($u<1$)). Use of these positive electrode materials enables a higher battery capacity and excellent cycle performance.

[Negative Electrode]

The negative electrode is configured as in the above negative electrode 10 for a lithium-ion secondary battery shown in FIG. 1, and, for example, has the negative electrode active material layer 12 disposed on both faces of the current collector 11. The negative electrode preferably has a negative-electrode charge capacity larger than a battery charge capacity (electrical capacitance) provided by the positive electrode active material, for this negative electrode itself can inhibit the precipitation of lithium metal.

The positive electrode active material layer is formed partially on both faces of the positive electrode current collector. The same is true of the negative electrode active material layer. Such a negative electrode may have, for example, an area at which the positive electrode active material layer is not present on the surface of the positive electrode current collector that the negative electrode active material layer faces. This area permits stable battery design.

The above area at which the positive and negative electrode active material layers do not face one another, a non-facing area, is hardly affected by charging and discharging. The status of the negative electrode active material layer is consequently maintained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolyte]

A part of the active material layers or the separator is impregnated with a liquid electrolyte (an electrolyte solution). The electrolyte is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, carbonic acid propylmethyl ester, 1,2-dimethoxyethane, and tetrahydrofuran.

Among these, ethylene carbonate, propylene carbonate, dimethyl carbonate, diethyl carbonate, or ethylmethyl carbonate, or the combination thereof is preferable. Such solvent enables better performances. The combination of a viscous solvent, such as ethylene carbonate or propylene carbonate, and a non-viscous solvent, such as dimethyl carbonate, diethyl carbonate or ethylmethyl carbonate allows much better performances, for such a solvent improves the dissociation of electrolyte salt and ionic mobility.

For an alloyed negative electrode, the solvent preferably contains at least one of a halogenated chain carbonic acid ester and a halogenated cyclic carbonic acid ester. Such a solvent enables the negative electrode active material to be coated with a stable coating at discharging and particularly charging. The halogenated chain carbonic acid ester is a chain carbonic acid ester including halogen, in which at least one hydrogen atom is replaced by a halogen atom. The halogenated cyclic carbonic acid ester is a cyclic carbonic acid ester including halogen, in which at least one hydrogen atom is replaced by a halogen atom.

The halogen is preferably, but not limited to, fluorine, for fluorine enables the formation of better coating than other halogens do. A larger number of halogens is better, for a more stable coating can be obtained which reduces a decomposition reaction of an electrolyte.

Examples of the halogenated chain carbonic acid ester include carbonic acid fluoromethylmethyl ester, and carbonic acid methyl(difluoromethyl) ester. Examples of the halogenated cyclic carbonic acid ester include 4-fluoro-1,3-dioxolan-2-one and 4,5-difluoro-1,3-dioxolan-2-one.

The solvent preferably contains an unsaturated carbon bond cyclic carbonate as an additive, for this enables the formation of a stable coating on a negative electrode at charging and discharging and the inhibition of a decomposition reaction of the electrolyte. Examples of the unsaturated carbon bond cyclic carbonate include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolyte. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent preferably ranges from 0.5 mol/kg to 2.5 mol/kg. This content enables high ionic conductivity.

[Manufacture of Laminate Film Secondary Battery]

Firstly, a positive electrode is produced with the above positive electrode material as follows. A positive electrode mixture is created by mixing the positive electrode material with as necessary the binder, the conductive additive, and other materials, and dispersed in an organic solvent to form slurry of the positive-electrode mixture. This slurry is then applied to a positive electrode current collector with a coating apparatus such as a die coater having a knife roll or a die head, and dried by hot air to obtain a positive electrode active material layer. The positive electrode active material layer is finally compressed with, for example, a roll press. The compression may be performed under heating. The compression and heating may be repeated multiple times.

Secondly, a negative electrode active material layer is formed on a negative electrode current collector to produce a negative electrode through the same procedure as in the above production of the negative electrode 10 for a lithium-ion secondary battery.

The positive electrode and the negative electrode are produced in the same way as above. When these electrodes are produced, the active material layers are formed on both faces of the positive and negative electrode current collector. In both the electrodes, the length of these active material layers formed on the faces may differ from one another (See FIG. 1).

Then, an electrolyte is prepared. With ultrasonic welding, the positive electrode lead 32 is attached to the positive electrode current collector and the negative-electrode lead 33 is attached to the negative electrode current collector. The positive and negative electrodes and the separator interposed therebetween are stacked or wound to produce the electrode body and a protecting tape is stuck to the outermost circumference of the body. The electrode body is flattened. The film-shaped outer part 35 is folded in half to interpose the electrode body therebetween. The insulating portions of the outer part are stuck to one another by heat sealing such that one of the four sides is opened to house the electrode body. The close adhesion films 34 are inserted between the outer part 35 and the positive and negative electrode leads 32, 33. The prepared electrolyte is introduced from the open side in a prescribed amount to perform the impregnation of the electrolyte under a vacuum. The open side is stuck by vacuum heat sealing.

In this manner, the laminate film secondary battery 30 can be produced.

EXAMPLE

The present invention will be more specifically described below with reference to examples and comparative examples, but the present invention is not limited thereto.

Example 1-1

The laminate film secondary battery 30 shown in FIG. 3 was produced by the following procedure.

The procedure began with the production of a positive electrode. Positive electrode active materials of 95 mass parts of $LiCoO_2$, a lithium cobalt complex oxide, 2.5 mass parts of a positive electrode conductive additive, and 2.5 mass parts of a positive electrode binder (polyvinylidene fluoride, PVDF) were mixed to produce a positive-electrode mixture. The positive-electrode mixture was dispersed in an organic solvent (N-methyl-2-pyrrolidone, NMP) to form paste slurry. The slurry was applied to both surfaces of a positive electrode current collector with a coating apparatus having a die head and dried with a drying apparatus of hot-air type. The positive electrode current collector had a thickness of 15 µm. The resultant was finally compressed with a roll press.

Next, a negative electrode was produced. For the production of a negative electrode active material, a mixed raw material of metallic silicon and silicon dioxide was placed in a reactor and vaporized under a vacuum of 10 Pa to deposit the vaporized material on an adsorption plate. The deposit was sufficiently cooled and then taken out to pulverize the deposit with a ball mill. After adjusting the particle size of the obtained powder, the powder was coated with a carbon layer by thermal CVD, as needed. The produced powder was bulk-modified by an electrochemical method in a mixed solvent having a propylene-carbonate-to-ethylene-carbonate ratio of 1:1, including 1.3 mol/kg of electrolyte salt. Then, the silicon-based active material particles and natural graphite were blended at a weight ratio of 5:95 (synthetic graphite, hard carbon, and soft carbon were also mixed to some negative electrodes, as needed). The active material composed of the silicon-based active material particles and the natural graphite, a first conductive additive, a second conductive additive, a first negative electrode binder (styrene-butadiene rubber, SBR), and a second negative electrode binder (carboxymethyl cellulose, CMC) were mixed at a dry-weight ratio of 90.5-92.5:1:1:2.5:3-5. The mixture was diluted with pure water to form slurry of a negative-electrode mixture. At this time, Group 1 and Group 2 metal salts in the periodic table were added. The metal salts used were a combination of lithium carbonate and sodium carbonate, which are inexpensive, available, and easy to dissolve in water. The negative-electrode mixture slurry was then applied to both surfaces of a negative electrode current collector with a coating apparatus and dried. The negative electrode current collector used was an electrolytic copper foil, having a thickness of 15 µm. The drying was performed under a vacuum at 120° C. for 10 hours.

A solvent was produced by mixing 4-fluoro-1,3-dioxolan-2-one (FEC), ethylene carbonate (EC), and dimethyl carbonate (DMC) and an electrolyte salt (lithium hexafluorophosphate, $LiPF_6$) was dissolved therein to produce an electrolyte. The composite of the solvent was FEC:EC: DMC=10:20:70 in term of the volume. The content of the electrolyte salt in the solvent was 1.0 mol/kg.

The secondary battery was assembled by the following procedure. An aluminum lead was first ultrasonic-welded to one end of the positive electrode current collector. A nickel lead was welded to one end of the negative electrode current collector. The positive electrode, a separator, the negative electrode, a separator were then stacked in this order and wound in a longitudinal direction to obtain a wound electrode body. The end of the wound part was fixed by a PET protecting tape. The separators were a 12-μm laminate film composed of a porous polyethylene film interposed between porous polypropylene films. The electrode body was interposed between outer parts and the outer circumferences except one side were heat-sealed to house the electrode body therein. The outer parts were an aluminum laminate film composed of a nylon film, aluminum foil, and a polypropylene film stacked. The prepared electrolyte was poured from an open side to perform the impregnation of the electrolyte under a vacuum. The open side was stuck by heat sealing.

Examples 1-2 to 1-5 and Comparative Examples 1-1 and 1-2

A secondary battery was produced as in example 1-1 except that oxygen amount in a bulk of the silicon compound was adjusted. Consequently, the x-value of the silicon compound expressed by $SiO_x$ varied in the range of 0.3 to 1.8. The amount of accumulated oxygen was adjusted by changing the temperature and the ratio of raw materials to be vaporized.

The silicon compounds in examples 1-1 to 1-5 and comparative examples 1-1 and 1-2 had the following physical properties: the silicon compound had a median diameter $D_{50}$ of 5 μm; the half width (2θ) of the diffraction peak attributable to a (111) crystal face and obtainable by X-ray diffraction was 1.22°; the crystallite size attributable to the (111) crystal face was 7.21 nm; the silicon compound contained LiF, $Li_2CO_3$, and $Li_2O$ on its surface; the active material contained $Li_4SiO_4$, $Li_6Si_2O_7$, and $Li_2SiO_3$ in its interior. Moreover, the carbon content was 5.0 mass %. The content ratio of natural graphite (particle size: 20 μm) to the silicon compound expressed by $SiO_x$ was 95:5. The metal salt (ion) surrounded the carbon material. The concentration of the metal ion in the electrode was 250 ppm in terms of the metal ion.

The cycle performance (retention rate %), the first charge and discharge performance (initial efficiency %), and SiO initial efficiency % of the secondary batteries in examples 1-1 to 1-5 and comparative examples 1-1 and 1-2 were investigated. The result is given in Table 1.

The cycle performance was investigated in the following manner: First, two cycles of charging and discharging were performed at 25° C. to stabilize the battery and the discharge capacity in the second cycle was measured. Next, the cycle of charging and discharging was repeated until the total number of cycles reached 100 cycles and the discharge capacity was measured every cycle. Finally, a capacity retention rate was calculated by dividing the discharge capacity in the 100-th cycle by the discharge capacity in the second cycle and multiply the resultant by 100. The cycle conditions were as follows: The secondary batteries charged with a constant current of 2.5 mA/cm² until the voltage reached 4.3V. After this voltage reached 4.3V, the charging was continued while the current density became 0.25 mA/cm² at a constant voltage of 4.3V. The batteries were then discharged with a constant current density of 2.5 mA/cm² until the voltage reached 3.0V.

The first charge and discharge performance was calculated by the following expression:

Initial Efficiency (%)=(First Discharge Capacity/First Charge Capacity)×100

The atmosphere temperate was the same as the cycle performance was investigated. The charging and discharging conditions were 0.2 times the conditions of the investigation of the cycle performance.

SiO initial efficiency shown in Tables 1, 7, 8, and 9 shows an initial efficiency of the battery using as the negative electrode active material the silicon compound alone and containing no carbon-based active material, such as natural graphite (20 μm). This allows the measurement of variation in initial efficiency depending only on variations of SiO (such as variations in production procedure, crystallinity, and median size).

TABLE 1

Binder: SBR:CMC, Half width θ = 1.22, Si (111) crystallite: 7.21 nm, Carbon content: 5.0%, FEC:EC:DMC (1:2:7 vol %) $LiPF_6$ 1.0 mol/kg, Positive electrode: $LiCoO_2$, Surface substance: LiF, $Li_2CO_3$, $Li_2O$, Substance inside active material: $Li_4SiO_4$, $Li_6Si_2O_7$, $Li_2SiO_3$, Natural graphite (20 μm)/SiO (5 μm) = 95/5, Metal salt location: around carbon material, Metal species: Li, Na, Metal salt concentration in electrode (in terms of metal ion): 250 ppm, Electrochemical modification method

| | SiOx | Retention rate % | Initial efficiency % | SiO initial efficiency % |
|---|---|---|---|---|
| Comparative example 1-1 | 0.3 | 82.1 | 88.2 | 82 |
| Example 1-1 | 0.5 | 84.1 | 87.9 | 81.5 |
| Example 1-2 | 0.7 | 86.9 | 87.5 | 81 |
| Example 1-3 | 0.9 | 87.4 | 87.3 | 80 |
| Example 1-4 | 1.2 | 87.7 | 87.3 | 80 |
| Example 1-5 | 1.6 | 88.1 | 87.1 | 79 |
| Comparative example 1-2 | 1.8 | — | — | — |

As shown in Table 1, when the x value of the silicon compound expressed by $SiO_x$ was out of 0.5≤x≤1.6, the battery performances degraded. In comparative example 1-1, for example, although the initial efficiency was improved because of lack of the oxygen amount (x=0.3), the retention rate significantly degraded. In comparative example 1-2, on the other hand, the measurement was impossible because both the retention rate and initial efficiency degraded due to reduction in conductivity caused by a large amount of oxygen (x=1.8).

In the following examples, $SiO_x$ (x=0.9) was used as the silicon compound as in example 1-3.

Examples 2-1 to 2-15

A secondary battery was produced as in example 1-3 except that the amount and the peak intensity ratio $I_{1330}/I_{1580}$ in Raman spectrometry of the carbon material (the carbon coating) for coating the silicon compound and the carbon additive (the carbon-based material) to be added in the inventive negative electrode were adjusted, as well as the kind and the median size of the carbon additive were changed. Table 2 shows values such as the peak intensity ratio in Raman spectrometry of the carbon coating and the carbon-based material (the negative electrode conductive additive). The peak intensity ratio of the carbon coating was adjusted by changing the temperature and the pressure in the furnace in the thermal CVD. The peak intensity ratio of the carbon additive was adjusted by changing the carbon additive species among acetylene black, flake graphite, and grassy carbon.

changed by changing the metal salt to be added into the slurry when the negative electrode was produced. The location of the ion was changed by changing the timing of adding the metal salt in the negative electrode production. For example, if an aqueous dispersion containing a carbon material and a metal salt is added to slurry containing the active material and a binder, the metal salt can be dispersed around the carbon material.

TABLE 2

Binder: SBR:CMC, Half width $\theta$ = 1.22, Si(111) crystallite: 7.21 nm, SiO$x$ (x = 0.9), FEC:EC:DMC(1:2:7 vol %) LiPF$_6$ 1.0 mol/kg, Positive electrode: LiCoO$_2$, Surface substance: LiF, Li$_2$CO$_3$, Li$_2$O, Substance inside active material: Li$_4$SiO$_4$, Li$_6$Si$_2$O$_7$, Li$_2$SiO$_3$, Natural graphite(20 μm)/SiO(5 μm) = 95/5, Metal salt location: around carbon material, Metal species: Li, Na, Metal salt concentration in electrode (in terms of metal ion): 250 ppm, Electrochemical modification method

|  | Method of forming carbon coating | Carbon coating content % | Carbon coating Raman $I_{1330}/I_{1580}$ | Carbon additive | Median size of carbon additive μm | Carbon additive content % | Carbon additive Raman $I_{1330}/I_{1580}$ | Retention rate % | Initial efficiency % |
|---|---|---|---|---|---|---|---|---|---|
| Example 2-1 | — | — | — | — | — | — | — | 86.1 | 86 |
| Example 2-2 | CVD | 5 | 0.7 | — | — | — | — | 85.4 | 86.7 |
| Example 2-3 | CVD | 5 | 1.2 | — | — | — | — | 88 | 87.3 |
| Example 2-4 | CVD | 10 | 1.1 | — | — | — | — | 88 | 87.3 |
| Example 2-5 | CVD | 20 | 0.85 | — | — | — | — | 87.5 | 87.3 |
| Example 2-6 | — | — | — | Flake graphite | 10 | 1 | 0.3 | 85.5 | 86 |
| Example 2-7 | — | — | — | Acetylene black | 0.2 | 1 | 1.2 | 86.5 | 86 |
| Example 2-8 | — | — | — | Acetylene black | 0.2 | 3 | 1.2 | 85.5 | 85 |
| Example 2-9 | CVD | 5 | 1.2 | Acetylene black | 0.2 | 1 | 1.2 | 90 | 87.3 |
| Example 2-10 | CVD | 20 | 0.85 | Acetylene black | 0.2 | 1 | 1.2 | 88 | 87.3 |
| Example 2-11 | CVD | 5 | 1.2 | Acetylene black | 0.2 | 3 | 1.2 | 89 | 85 |
| Example 2-12 | CVD | 5 | 1.2 | Acetylene black | 0.2 | 5 | 1.2 | 88.8 | 84.7 |
| Example 2-13 | CVD | 20 | 0.85 | Acetylene black | 0.2 | 3 | 1.2 | 87 | 85 |
| Example 2-14 | CVD | 5 | 2.2 | — | — | — | — | 84.4 | 84.3 |
| Example 2-15 | — | — | — | Glassy carbon | 0.4 | 1 | 1.5 | 84.2 | 84.1 |

As shown in Table 2, the silicon compound having the carbon coating exhibited better conductivity, retention rate, and initial efficiency than one coated with no carbon material. Moreover, when the content of the carbon coating was 20% or less, the carbon coating did not contribute to charging and discharging so much, and thus the retention rate was improved. The result also shows the following: The carbon coating preferably satisfies 0.7<$I_{1330}/I_{1580}$<1.5, particularly 0.7<$I_{1330}/I_{1580}$<1.2. As to the carbon additive, flake graphite is preferable to grassy carbon; acetylene black (having a median size of 0.2 μm) is preferable to flake graphite. The reason is that a carbon material having a particle size smaller than the silicon compound is easy to surround the silicon compound, effectively improving the conductivity. The batteries in which the carbon coating was formed and the conductive additive was added had better conductivity, retention rate, and initial efficiency than those in which acetylene black was added while the silicon compound was not coated with a carbon material. However, the adding amount of acetylene black is preferably 3% or less. This range prevents the initial efficiency from decreasing due to irreversible capacity of the acetylene black itself.

Examples 3-1 to 3-9

A secondary battery was produced as in example 1-3 except that ion species and the location of the ion contained in the negative electrode were changed. The ion species was Comparative Example 3-1

A secondary battery was produced as in example 1-3 except that tin carbonate was added as the metal salt.

TABLE 3

Binder: SBR:CMC, Half width $\theta$ = 1.22, Si (111) crystallite: 7.21 nm, SiO$x$ (x = 0.9), Carbon content: 5.0%, FEC:EC:DMC (1:2:7 vol %) LiPF$_6$ 1.0 mol/kg, Positive electrode: LiCoO$_2$, Surface substance: LiF, Li$_2$CO$_3$, Li$_2$O, Substance inside active material: Li$_4$SiO$_4$, Li$_6$Si$_2$O$_7$, Li$_2$SiO$_3$, Natural graphite (20 μm)/SiO (5 μm) = 95/5, Metal salt concentration in electrode (in terms of metal ion): 250 ppm, Electrochemical modification method

|  | Location of prescribed ion species | Location of carbon coating | Ion species | Retention rate % | Initial efficiency % |
|---|---|---|---|---|---|
| Example 3-1 | around carbon material | outer shell of Si compound | Li$^+$ | 90 | 87.3 |
| Example 3-2 | above electrode | outer shell of Si compound | Li$^+$ | 88 | 85.8 |
| Example 3-3 | outer shell of Si compound | around metal salt | Li$^+$ | 89.5 | 86.8 |
| Example 3-4 | around carbon material | outer shell of Si compound | Na$^+$ | 90 | 87.1 |

TABLE 3-continued

Binder: SBR:CMC, Half width θ = 1.22, Si (111) crystallite: 7.21 nm,
SiOx (x = 0.9), Carbon content: 5.0%, FEC:EC:DMC (1:2:7 vol %)
LiPF$_6$ 1.0 mol/kg, Positive electrode: LiCoO$_2$,
Surface substance: LiF, Li$_2$CO$_3$, Li$_2$O, Substance inside
active material: Li$_4$SiO$_4$, Li$_6$Si$_2$O$_7$, Li$_2$SiO$_3$, Natural graphite
(20 μm)/SiO (5 μm) = 95/5, Metal salt concentration in electrode
(in terms of metal ion): 250 ppm, Electrochemical modification method

| | Location of prescribed ion species | Location of carbon coating | Ion species | Retention rate % | Initial efficiency % |
|---|---|---|---|---|---|
| Example 3-5 | around carbon material | outer shell of Si compound | K$^+$ | 89.5 | 86.5 |
| Example 3-6 | around carbon material | outer shell of Si compound | Ma$^{2+}$ | 88 | 86.1 |
| Example 3-7 | around carbon material | outer shell of Si compound | Ca$^{2+}$ | 86.1 | 85.1 |
| Example 3-8 | around carbon material | outer shell of Si compound | Sr$^{2+}$ | 85.8 | 85.3 |
| Example 3-9 | around carbon material | outer shell of Si compound | NH$_4^+$ | 89.8 | 87.0 |
| Comparative example 3-1 | around carbon material | outer shell of Si compound | Sn$^{2+}$ | 80 | 85.5 |

When the ion species was a Group 1 metal ion or a Group 2 metal ion in the periodic table, or an ammonium ion, the battery performances were improved. The other metal species (Sn) caused an electrochemical reduction and precipitation of the simple substance on the negative electrode, degrading both the retention rate and the initial efficiency. Among the Group 1 and Group 2 metal salts in the periodic table, lithium salts, sodium salts, and potassium salts, especially lithium salts and sodium salts are preferable as the metal salt to be added. Lithium salts and sodium salts, which have an ionic radius close to that of lithium ions, highly inhibit the elution of the lithium compound produced by the bulk modification of the silicon compound. In addition, the location of the metal salt (ion) is preferably around the carbon material. This location prevents degradation of conductivity of the electrode and the silicon compound, which is an active material, and prevents reduction in the initial efficiency, compared with the case where the ion is located above the electrode, or the ion is located in the outer shell of the silicon compound. The negative electrode used in the following examples contains lithium as the metal ion species. More specifically, lithium carbonate was used as the metal salt to be added so that the metal salt (ion) surrounded the carbon material.

Examples 4-1 to 4-6

A secondary battery was produced as in example 1-3 except that only lithium ion (Li$^+$) was used as the metal ion contained in the negative electrode, and the concentration of the ion was adjusted. The result is given in Table 4.

TABLE 4

Binder: SBR:CMC, Half width θ = 1.22, Si (111) crystallite: 7.21 nm,
SiOx (x = 0.9), Carbon content: 5.0%, FEC:EC:DMC (1:2:7 vol %)
LiPF$_6$ 1.0 mol/kg, Positive electrode: LiCoO$_2$, Surface substance:
LiF, Li$_2$CO$_3$, Li$_2$O, Substance inside active material: Li$_4$SiO$_4$,
Li$_6$Si$_2$O$_7$, Li$_2$SiO$_3$, Natural graphite (20 μm)/SiO (5 μm) = 95/5,
Metal salt location: around carbon material, Metal species: Li,
Electrochemical modification method

| | Metal ion concentration (Li$^+$) | Retention rate % | Initial efficiency % |
|---|---|---|---|
| Example 4-1 | 5 ppm | 84.1 | 86.1 |
| Example 4-2 | 250 ppm | 90 | 87.3 |
| Example 4-3 | 1320 ppm | 89.9 | 87.1 |
| Example 4-4 | 5300 ppm | 88.5 | 86.9 |
| Example 4-5 | 0.013% | 88.1 | 86.7 |
| Example 4-6 | 0.057% | 86.3 | 86.3 |

When the metal ion had a concentration of $1 \times 10^{-3}$ mass % or more, the electrochemically modified silicon compound contained an appropriate amount of the metal salt. This yields water resistance, resulting in good retention rate and initial efficiency. When the concentration was 2 mass % or less, degradation of the silicon compound and gelation of slurry were prevented, resulting in good retention rate and initial efficiency. This indicates that the metal ion preferably has a concentration ranging from $1 \times 10^{-3}$ mass % to 2 mass % in terms of the metal ion.

Examples 5-1 to 5-5

A secondary battery was produced as in example 1-3 except that the binder used in the negative electrode was changed. The result is given in Table 5.

TABLE 5

Half width θ = 1.22, Si (111) crystallite: 7.21 nm, SiOx (x = 0.9),
Carbon content: 5.0%, FEC:EC:DMC (1:2:7 vol %) LiPF$_6$ 1.0 mol/kg,
Positive electrode: LiCoO$_2$, Surface substance: LiF, Li$_2$CO$_3$, Li$_2$O,
Substance inside active material: Li$_4$SiO$_4$, Li$_6$Si$_2$O$_7$, Li$_2$SiO$_3$,
Natural graphite (20 μm)/SiO (5 μm) = 95/5, Metal salt location:
around carbon material, Metal species: Li, Metal salt
concentration in electrode (in terms of metalion): 250 ppm,
Electrochemical modification method

| | Binder | Retention rate % | Initial efficiency % |
|---|---|---|---|
| Example 5-1 | SBR/CMC | 90 | 87.3 |
| Example 5-2 | PVA | 89.8 | 86.9 |
| Example 5-3 | PAA | 89.9 | 87.2 |
| Example 5-4 | PI | 90 | 85.8 |
| Example 5-5 | PAI | 89.5 | 85.9 |

As shown in Table 5, styrene-butadiene rubber (SBR), carboxymethyl cellulose (CMC), polyvinyl alcohol (PVA), polyacrylic acid (PAA), polyimide (PI), and polyamideimide (PAI) may be used as the binder. Above all, example using the combination of SBR and CMC (example 5-1) exhibited good retention rate and initial efficiency. As described previously, the binder preferably contains a functional group of a carbonyl group, a hydroxyl group, and an amino group, particularly a carbonyl group and a hydroxyl group. Such a binder causes the carbonyl group and the hydroxyl group to draw the metal ion and then more metal salts (ions) to surround the carbon material. Examples of the binder containing such functional groups include carboxymethyl cellulose, an alkali metal salt thereof, polyacrylic acid, an alkali metal salt thereof, and polyvinyl alcohol.

Examples 6-1 and 6-2

A secondary battery was produced as in example 1-3 except that, when the silicon compound was bulk-modified to produce a lithium compound, potential, current, and the method of inserting and extracting lithium were changed to adjust the condition of the compound produced in inventive the silicon compound. For example, electrochemical modification produces LiF, $Li_2CO_3$, and $Li_2O$ on the surface, and $Li_2SiO_3$, $Li_6Si_2O_7$, and $Li_4SiO_4$ in the interior. Moreover, the lithium compound on the surface can be removed by cleaning with water. In this way, in example 6-1, LiF, $Li_2CO_3$, and $Li_2O$ were produced on the surface and $Li_2SiO_3$, $Li_6Si_2O_7$, and $Li_4SiO_4$ were produced inside the silicon compound. In example 6-2, the lithium compounds on the surface of the silicon compound were removed while $Li_2SiO_3$, $Li_6Si_2O_7$, and $Li_4SiO_4$ remained inside.

The obtained lithium compounds could be observed by XPS. For example, $Li_4SiO_4$ was detected by a binding energy of about 532 eV, and $Li_2SiO_3$ was detected by a binding energy of about 530 eV. The obtained lithium compounds could also be observed by $^{29}$Si-MAS-NMR spectrum.

Comparative Example 6-1

A secondary battery was produced as in example 1-3 except that the silicon compound was not bulk-modified.

The cycle performance and the first charge and discharge performance of the secondary batteries in examples 6-1 and 6-2 and comparative example 6-1 were investigated. The result is given in Table 6.

TABLE 6

Binder: SBR:CMC, Half width θ = 1.22, Si (111) crystallite: 7.21 nm, SiO$x$ (x = 0.9), Carbon content: 5.0%, FEC:EC:DMC (1:2:7 vol %) LiPF$_6$ 1.0 mol/kg, Positive electrode: LiCoO$_2$, Natural graphite (20 μm)/SiO (5 μm) = 95/5, Metal salt location: around carbon material, Metal species: Li, Metal salt concentration in electrode (in terms of metal ion): 250 ppm, Electrochemical modification method

| | Surface substance | Substance inside active material | Retention rate % | Initial efficiency % |
|---|---|---|---|---|
| Example 6-1 | LiF, Li$_2$CO$_3$, Li$_2$O | Li$_2$SiO$_3$, Li$_6$Si$_2$O$_7$, Li$_4$SiO$_4$ | 90 | 87.3 |
| Example 6-2 | — | Li$_2$SiO$_3$, Li$_6$Si$_2$O$_7$, Li$_4$SiO$_4$ | 89.2 | 85.7 |
| Comparative example 6-1 | — | — | 69 | 85.2 |

As described previously, when the silicon compound is modified in an electrochemical manner, LiF, $Li_2CO_3$, and $Li_2O$ are produced on the surface, and $Li_2SiO_3$, $Li_6Si_2O_7$, and $Li_4SiO_4$ are produced in the interior. Moreover, the lithium compound on the surface can be removed by cleaning with water. Example 6-1, in which the best bulk condition was achieved by these reaction, especially improved the capacity retention rate and the initial efficiency. In other words, the silicon compound preferably contains LiF, $Li_2CO_3$, and $Li_2O$ on its surface, and the active material preferably contains $Li_2SiO_3$, $Li_6Si_2O_7$, and $Li_4SiO_4$ in its interior.

Example 7-1

A secondary battery was produced by modifying the silicon compound in the electrochemical manner as in example 1-3.

Example 7-2

A secondary battery was produced as in example 1-3 except that the silicon compound was modified by a thermal doping method with lithium.

Comparative Example 7-1

A secondary battery was produced as in example 1-3 except that the silicon compound was not modified by introducing lithium.

The cycle performance, the first charge and discharge performance, and SiO initial efficiency % of the secondary batteries in examples 7-1 and 7-2 and comparative example 7-1 were investigated. The result is given in Table 7.

TABLE 7

Binder: SBR:CMC, Half width θ = 1.22, Si (111) crystallite: 7.21 nm, SiO$x$ (x = 0.9), Carbon content: 5.0%, FEC:EC:DMC (1:2:7 vol %) LiPF$_6$ 1.0 mol/kg, Positive electrode: LiCoO$_2$, Surface substance: LiF, Li$_2$CO$_3$, Li$_2$O, Substance inside active material: Li$_4$SiO$_4$, Li$_6$Si$_2$O$_7$, Li$_2$SiO$_3$, Natural graphite (20 μm)/SiO (5 μm) = 95/5, Metal salt location: around carbon material, Metal species: Li, Metal salt concentration in electrode (in terms of metal ion): 250 ppm,

| | Doping method | Retention rate % | Initial efficiency % | SiO initial efficiency % |
|---|---|---|---|---|
| Example 7-1 | electrochemical modification method | 87.4 | 87.3 | 80 |
| Example 7-2 | thermal doping method | 85.1 | 86.7 | 78 |
| Comparative example 7-1 | — | 69 | 85.2 | 70.1 |

As shown in Table 7, the electrochemical method was preferred as the bulk modification method of the silicon compound. The thermal doping method, in which a silicon material mixed with lithium metal or a lithium compound was subjected to heat treatment, could not modify the active material well.

Examples 8-1 to 8-6

A secondary battery was produced as in example 1-3 except that the crystallinity of the silicon compound was changed. The crystallinity can be changed by a heat treatment under a non-atmospheric condition after insertion and extraction of lithium. Although example 8-1 exhibited a crystallite size of 1.542, this value was obtained by fitting with analysis software because the peak value was not obtained. The silicon compound in example 8-1 was substantially amorphous.

The cycle performance, the first charge and discharge performance, and SiO initial efficiency % of the secondary batteries in examples 8-1 to 8-6 were investigated. The result is given in Table 8.

TABLE 8

Binder: SBR:CMC, SiOx (x = 0.9), Carbon content: 5.0%,
FEC:EC:DMC (1:2:7 vol %) LiPF$_6$ 1.0 mol/kg, Positive electrode:
LiCoO$_2$, Surface substance: LiF, Li$_2$CO$_3$, Li$_2$O, Substance inside
active material: Li$_4$SiO$_4$, Li$_6$Si$_2$O$_7$, Li$_2$SiO$_3$, Natural
graphite (20 μm)/SiO (5 μm) = 95/5, Metal salt location: around carbon
material, Metal species: Li, Metal salt concentration in electrode
(in terms of metal ion): 250 ppm, Electrochemical
modification method

|  | Half width 2θ (°) | Crystallite size nm | Retention rate % | Initial efficiency % | SiO initial efficiency % |
|---|---|---|---|---|---|
| Example 8-1 | 10.123 | 1.542 | 90.4 | 86.9 | 79.6 |
| Example 8-2 | 2.257 | 3.77 | 90.4 | 87.2 | 79.8 |
| Example 8-3 | 1.845 | 4.62 | 90 | 87.3 | 80 |
| Example 8-4 | 1.271 | 6.63 | 89.5 | 87.4 | 80.2 |
| Example 8-5 | 0.796 | 10.84 | 88.9 | 87.5 | 80.5 |
| Example 8-6 | 0.756 | 11.42 | 88 | 87.8 | 80.9 |

As shown in Table 8, the capacity retention rate and the initial efficiency changed in response to the variation in the crystallinity of the silicon compound. In particular, a high capacity retention rate and a high initial efficiency were obtained by low crystallinity materials with a crystallite size of 7.5 nm or less, which is attributable to an Si(111) crystal face. The best battery performances were obtained when the silicon compound was amorphous.

Examples 9-1 to 9-4

A secondary battery was produced as in example 1-3 except that the median size of the silicon compound was changed.

The cycle performance, the first charge and discharge performance, and SiO initial efficiency % of the secondary batteries in examples 9-1 to 9-4 were investigated. The result is given in Table 9.

TABLE 9

Binder: SBR:CMC, Half width θ = 1.22, Si (111) crystallite: 7.21 nm,
SiOx (x = 0.9), Carbon content: 5.0%, FEC:EC:DMC (1:2:7 vol %)
LiPF$_6$ 1.0 mol/kg, Positive electrode: LiCoO$_2$, Surface substance:
LiF, Li$_2$CO$_3$, Li$_2$O, Substance inside active material: Li$_4$SiO$_4$,
Li$_6$Si$_2$O$_7$, Li$_2$SiO$_3$, Natural graphite (20 μm)/SiO = 95/5, Metal salt
location: around carbon material, Metal species: Li, Metal salt
concentration in electrode (in terms of metal ion): 250 ppm,
Electrochemical modification method

|  | Median size μm | Retention rate % | Initial efficiency % | SiO initial efficiency % |
|---|---|---|---|---|
| Example 9-1 | 5.1 | 90 | 87.3 | 80 |
| Example 9-2 | 1.3 | 90.2 | 87.1 | 79.4 |
| Example 9-3 | 8.1 | 90 | 87.3 | 79.9 |
| Example 9-4 | 12.3 | 89.8 | 87.3 | 79.1 |

As shown in Table 9, the retention rate and initial efficiency changed in response to the variation in the median size of the silicon compound. Examples 9-1 to 9-4 demonstrated that the retention rate and initial efficiency were higher when the median size of the silicon compound ranged from 0.5 μm to 20 μm. In particular, a better retention rate was obtained when the median size was 6 μm or less.

Examples 10-1 to 10-6

A secondary battery was produced as in example 1-3 except that the content ratio of the silicon compound to the carbon-based active material in the negative electrode (the percentage of the silicon compound in the active material) was changed, and the binder to be used was determined according to the ratio.

Comparative Example 10-1

A secondary battery was produced as in example 1-3 except that a negative electrode active material composed of only a carbon-based active material and containing no silicon compound was used.

The cycle performance and the first charge and discharge performance of the secondary batteries in examples 10-1 to 10-6 and comparative example 10-1 were investigated. The result is given in Table 10.

TABLE 10

Half width θ = 1.22, Si (111) crystallite: 7.21 nm, SiOx (x = 0.9),
Carbon content: 5.0%, FEC:EC:DMC (1:2:7 vol %) LiPF$_6$ 1.0 mol/kg,
Positive electrode: LiCoO$_2$, Surface substance: LiF, Li$_2$CO$_3$, Li$_2$O,
Substance inside active material: Li$_4$SiO$_4$, Li$_6$Si$_2$O$_7$, Li$_2$SiO$_3$,
Natural graphite(20 μm), Metal salt location: around carbon material,
Metal species: Li, Metal salt concentration in electrode (in terms of
metal ion): 250 ppm, Electrochemical modification method

|  | SiO material ratio inactive material % | Relative capacity density | Retention rate % | Initial efficiency % | Binder |
|---|---|---|---|---|---|
| Comparative example 10-1 | 0 | 1.00 | 94.1 | 89.8 | SBR/CMC |
| Example 10-1 | 0.04 | 1.03 | 90.3 | 88 | SBR/CMC |
| Example 10-2 | 0.05 | 1.04 | 90 | 87.3 | SBR/CMC |
| Example 10-3 | 0.1 | 1.07 | 87 | 86.1 | SBR/CMC |
| Example 10-4 | 0.25 | 1.13 | 86.2 | 83.5 | PI |
| Example 10-5 | 0.5 | 1.17 | 85.3 | 81.3 | PI |
| Example 10-6 | 1 | 1.18 | 84.9 | 80 | PI |

As shown in Table 10, the increase in the percentage of the silicon compound increased the capacity of the negative electrode but reduced the initial efficiency and the retention rate. Herein, the relative capacity density is on the basis of a capacity density of the battery having a SiO material ratio in the active material of 0 and including a positive electrode material composed of NCA (a lithium nickel cobalt aluminum complex oxide), with a discharging cutoff voltage of 2.5V (comparative example 10-1). The reduction in the percentage of the silicon compound improved the initial efficiency and retention rate but reduced the capacity density. In particular, comparative example 10-1, in which the carbon-based active material alone was used as the negative electrode active material, failed to obtain a lithium-ion secondary battery having a higher capacity density.

In addition, the carbon material (the carbon-based active material) in the negative electrode active material layer is preferably equal to or larger than the silicon compound. When the silicon compound, which is expandable and contractible, is smaller than the carbon material, breakage of the mixture layer can be prevented. When the particle size of the carbon material is larger than that of the silicon compound, the volume density of the negative electrode at charging, the initial efficiency, and thus the battery energy density are improved.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A negative electrode material for a non-aqueous electrolyte secondary battery, comprising:
   negative electrode active material particles containing a silicon compound expressed by $SiO_x$, where $0.5 \leq x \leq 1.6$, the silicon compound containing in its interior a lithium compound; and
   one or more ions selected from Group 1 metal ions, Group 2 metal ions, and substitutable ammonium ions; wherein
       the silicon compound is at least partially coated with a carbon coating, and the carbon coating exhibits scattering peaks at 1330 cm$^{-1}$ and 1580 cm$^{-1}$ in Raman spectrometry and satisfies $0.7 < I_{1330}/I_{1580} < 2.0$ where $I_{1330}/I_{15800}$ is a ratio of an intensity of the scattering peak at 1330 cm$^{-1}$ to that at 1580 cm$^{-1}$, and
       a content of the carbon coating is 20 mass % or less with respect to a total of the silicon compound and the carbon coating.

2. The negative electrode material for a non-aqueous electrolyte secondary battery according to claim 1, wherein the negative electrode active material particles are at least partially surrounded with a carbon-based material having a median size smaller than that of the silicon compound, and the carbon-based material exhibits scattering peaks at 1330 cm$^{-1}$ and 1580 cm$^{-1}$ in Raman spectrometry and satisfies $0.3 < I_{1330}/I_{1580} < 1.2$ where $I_{1330}/I_{1580}$ is a ratio of an intensity of the scattering peak at 1330 cm$^{-1}$ to that at 1580 cm$^{-1}$.

3. The negative electrode material for a non-aqueous electrolyte secondary battery according to claim 1, wherein the ion surrounds either or both of the carbon coating and the carbon-based material.

4. The negative electrode material for a non-aqueous electrolyte secondary battery according to claim 1, wherein the ion is added in the form of either or both of a metal salt and a substitutable ammonium salt.

5. The negative electrode material for a non-aqueous electrolyte secondary battery according to claim 4, wherein the metal salt comprises at least one of a lithium salt, a sodium salt, and a potassium salt.

6. The negative electrode material for a non-aqueous electrolyte secondary battery according to claim 1, further comprising a binder containing at least one functional group selected from a carbonyl group, a hydroxyl group, and an amino group.

7. The negative electrode material for a non-aqueous electrolyte secondary battery according to claim 6, wherein the binder comprises at least one of carboxymethyl cellulose, an alkali metal salt thereof, polyacrylic acid, an alkali metal salt thereof, and polyvinyl alcohol.

8. The negative electrode material for a non-aqueous electrolyte secondary battery according to claim 1, wherein the silicon compound contains on its surface at least one lithium compound selected from $Li_2CO_3$, $Li_2O$, LiOH, and LiF.

9. The negative electrode material for a non-aqueous electrolyte secondary battery according to claim 1, wherein the silicon compound contains in its interior at least one lithium compound selected from $Li_2SiO_3$, $Li_6Si_2O_7$, and $Li_4SiO_4$.

10. The negative electrode material for a non-aqueous electrolyte secondary battery according to claim 1, wherein the negative electrode active material particles exhibit a diffraction peak having a half width (2θ) of 1.2° or more, the diffraction peak being attributable to a (111) crystal face and obtained by X-ray diffraction, and a crystallite size attributable to the crystal face is 7.5 nm or less.

11. The negative electrode material for a non-aqueous electrolyte secondary battery according to claim 1, wherein the negative electrode active material particles have a median size ranging from 0.5 μm to 20 μm.

12. The negative electrode material for a non-aqueous electrolyte secondary battery according to claim 1, wherein the negative electrode active material particles are produced by a method including an electrochemical manner,
   the method including the electrochemical manner comprising:
       preparing a bulk modification apparatus comprising a bath filled with an organic solvent, a positive electrode to be a lithium source provided within the bath and connected to one terminal of a power source, a powder storage container provided within the bath and connected to the other terminal of the power source, and a separator provided between the positive electrode and the powder storage container,
       storing the silicon compound powder in the powder storage container; and
       conducting charge and discharge by the power source.

13. The negative electrode material for a non-aqueous electrolyte secondary battery according to claim 1, wherein a content of the ion is in a range of from $1 \times 10^{-3}$ mass % to 2 mass %.

14. A negative electrode for a non-aqueous electrolyte secondary battery comprising a negative electrode material according to claim 1.

15. The negative electrode for a non-aqueous electrolyte secondary battery according to claim 14, further comprising a carbon-based active material.

16. The negative electrode for a non-aqueous electrolyte secondary battery according to claim 15, wherein a content of the silicon compound is 5 mass % or more and less than 90 mass % with respect to the carbon-based active material.

17. A non-aqueous electrolyte secondary battery comprising a negative electrode according to claim 14.

18. A method of producing a negative electrode for a non-aqueous electrolyte secondary battery, the method comprising:
   producing a silicon compound expressed by $SiO_x$ where $0.5 \leq x \leq 1.6$;
   coating the silicon compound with a carbon coating;
   inserting lithium into the silicon compound and thereby forming a lithium compound inside the silicon compound to modify the silicon compound and obtain negative electrode active material particles;
   mixing the negative electrode active material particles with a solvent and one or more salts selected from Group 1 metal salts, Group 2 metal salts, and substitutable ammonium salts to form slurry; and
   applying the slurry to a surface of a negative electrode current collector and drying the slurry to form a negative electrode active material layer that includes the silicon compound; wherein
   the silicon compound included in the negative electrode active material layer is at least partially coated with the carbon coating, and the carbon coating exhibits scattering peaks at 1330 cm$^{-1}$ and 1580 cm$^{-1}$ in Raman spectrometry and satisfies $0.7 < I_{1330}/I_{1580} < 2.0$ where $I_{1330}/I_{1580}$ is a ratio of an intensity of the scattering peak at 1330 cm$^{-1}$ to that at 1580 cm$^{-1}$, and a content of the carbon coating is 20 mass % or less with respect to a total of the silicon compound and the carbon coating.

* * * * *